Jan. 3, 1939.  V. GROSSE  2,142,840
ELECTRIC CIRCUIT INTERRUPTER
Filed April 7, 1938
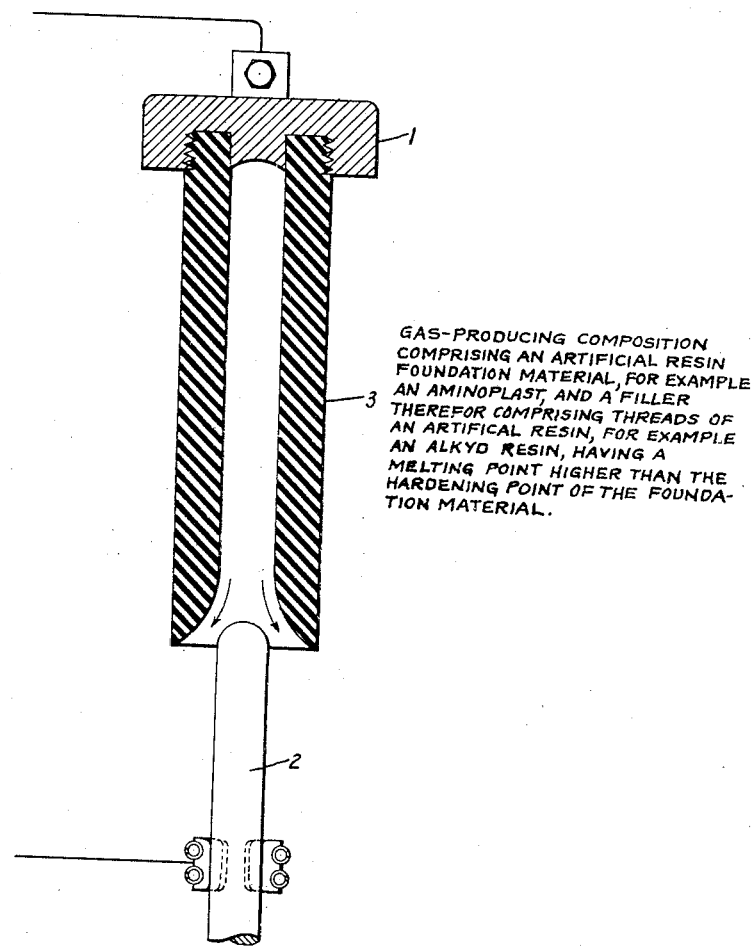
Inventor:
Vitaly Grosse,
by Harry E. Dunham
His Attorney Patented Jan. 3, 1939

2,142,840

UNITED STATES PATENT OFFICE 2,142,840

ELECTRIC CIRCUIT INTERRUPTER

Vitaly Grosse, Berlin-Lichterfelde, Germany, assignor to General Electric Company, a corporation of New York Application April 7, 1938, Serial No. 200,784
In Germany June 29, 1937

5 Claims. (Cl. 200—149)

This invention relates to electric circuit interrupters, and more particularly to circuit interrupters of the air-break expulsion type wherein a gas formed by decomposition of a material by the arc upon opening of the circuit is utilized to interrupt the arc.

In a well-known form of circuit interrupter of the aforesaid type, the arc is drawn in a confining insulating structure, such as a tube composed of material which under the influence of the arc heat emits gases or vapors tending to extinguish the arc. Inorganic materials such, for example, as boric acid and ammonium alum heretofore have been proposed for constructing or surfacing the walls of such arc-interrupting tubes. It is likewise known to form the gas-emitting walls of artificial resins such as aminoplasts (general term for synthetic resins from amido or amino compounds). Arc-quenching tubes formed solely of aminoplasts, because of their limited wall strength, are unable to withstand the high internal pressure caused by the arc-interrupting processes. They must therefore be provided with suitable reinforcing means, for example by combining with a wound fiber tube or by incorporating filling materials therein. Filling materials heretofore used have necessitated a compromise in the desired characteristics. Improvement in mechanical strength generally resulted in a lessening of the gas-evolving properties of the tube walls. On the other hand when the tube was satisfactory from the standpoint of arc-extinguishing properties, its strength was insufficient to meet service requirements.

More recently, other gas-producing materials or compositions containing the same have come into prominence for making arc-insulating members. For example, in Burmeister U. S. Patent 2,089,050 is disclosed and claimed an arc-confining structure composed of oxalic acid; and in Burmeister U. S. Patent 2,089,051, mechanically strong organic material, for instance hard rubber, impregnated with an inorganic material which upon decomposition yields an arc-interrupting gas and, specifically, with ammonium carbonate or bicarbonate, calcium carbonate, etc. Reference is also made to the co-pending applications of Paul Nowak, Serial No. 200,798, of Rudolf Auerbach and Hermann Burmeister, Serial No. 200,770 filed concurrently herewith and that of Hans Schuhmann, Serial No. 201,410, filed April 11, 1938, and assigned to the same assignee as the present invention. In these co-pending applications other solutions to the same general problem of improving circuit interrupters of the air-break expulsion type are disclosed and claimed.

In accordance with the present invention, electric circuit interrupters having insulating structures disposed adjacent and in confining relation to an arc formed upon opening the circuit comprise an artificial resin, for example an aminoplast, alkyd resin, or the like, having distributed therethrough solid but flexible threads of an artificial resin of the same or a different kind as the main resin mass. I prefer to use an aminoplast, for instance urea- or thio-urea-formaldehyde condensation product, which is filled with threads or fabric of alkyd resin.

My invention will be set forth more fully in the following description referring to the accompanying drawing, and the features of novelty which characterize my invention will be pointed out with particularity in the claims annexed to and forming a part of this specification.

Referring to the drawing the single figure thereof is an elevational view, partly in section, of an electric circuit breaker of the expulsion type to which the present invention is applicable.

There is shown merely by way of example an electric circuit interrupter, more particularly a circuit breaker having means such as the stationary contact 1 and the movable rod contact 2, for opening the circuit so as to form an arc; and an insulating structure 3 forming an arc chamber for closely confining the arc between the contacts. The insulating structure 3 consists of a tubular member closed at the fixed contact end and open at the other end for receiving the rod contact. Upon opening of the circuit, separation of the contacts 1 and 2 causes formation of an arc which decomposes some of the material of the arc chamber walls 3. The gas so formed is under considerable pressure by reason of the comparatively close fit of the rod contact 2 and the tube 3, with the result that when the rod leaves the tube a blast of gas is released as indicated for interrupting the arc.

In accordance with the present invention the insulating structure 3 contains solid, flexible resin filaments, threads or fabric as filling or reinforcing agents for a resin mass. These filaments may be produced, for example, by forcing a plastic artificial resin through an orifice into a refining bath in accordance with known practice in artificial silk thread manufacture. Textile fibers of alkyd resins may be made, for instance, as described in U. S. Patent 1,884,289, issued October 25, 1932, to Hans Schuhmann.

Although I prefer to use an alkyd resin formed mainly of the reaction product of glycerol and phthalic anhydride, that is a glycerol-phthalate resin, other polyhydric alcohols and polybasic acids may be used in combination. For example, adipic acid, succinic acid and the like may be employed in place of all or a part of the phthalic anhydride; and glycols, for instance ethylene glycol, may wholly or partly replace the glycerol. Oil-modified alkyd resin prepared as described, for example, in U. S. Patent 1,893,873 issued to Roy H. Kienle on January 10, 1933, or suitably plasticized alkyd resins (see the aforesaid Schuhmann patent) also may be employed.

When using aminoplasts, alkyd resins and similar materials that can be hardened, it is preferred that the resin threads be formed of pre-condensed or pre-polymerized material. After a preliminary hardening operation, undertaken directly following the precipitation of the initial condensation product, threads may be formed of the partly hardened material and such threads used as a filler for the pure artificial resin. In this way arc-confining structures of increased mechanical rigidity are obtained without lessening the gas-evolving properties of the structure. This is because the reinforcing agent is a substance which has approximately the same good properties with respect to arc extinction as the homogeneous base or foundation resin.

In order to obtain maximum mechanical strength it is expedient to increase the amount of threads employed to a maximum consistent with ease in shaping the mass and the production of a structure adapted to meet the service requirements. In some cases it is desirable to add to the resin threads only so much of the subsequently condensed resin foundation material as is necessary for bonding the threads together. The threads may be of short fiber length, or they may be in the form of long fibers of a length sufficient for stranding or weaving. A textile fabric made of the spun resin filaments forms a suitable means for reinforcing the structure. For example, an aminoplast may be suitably combined with a fabric formed of alkyd resin filaments or threads. Pieces of the woven alkyd resin may be used as filling material for the aminoplast, or layers of such resin fabric may be bonded together with an aminoplast. Spun threads of resin may be so arranged, if desired, that they lie in the same direction as the mechanical stresses to which the walls of the insulating structure are exposed during the arc-interrupting process. For example, in the case of a tubular insulating structure it is preferable that the threads of resin filler be arranged concentrically to the axis of the tube.

When selecting the artificial materials for the production of the threads, particular attention should be given to the resistance to heat of the selected material in thread form. This is because the filling resin threads must be pressed together with the foundation resin material at the hardening temperature of the latter. In order that the threads will not liquefy and lose their structure at this temperature, the melting point of the resin threads must be somewhat higher than the hardening point of the surrounding resin. Usually no liquefaction of the threads occurs when there is a substantial difference between the chemical composition of the threads and that of the surrounding resin, since the melting and hardening points of chemically different resins usually are different. For example, threads of alkyd resin in a cured or semi-cured state have an adequate resistance to heat to enable them to be pressed together with an aminoplast such as urea-formaldehyde resin.

Of course it is also possible to employ artificial resins containing other fillers or addition materials in producing either the foundation material or the resin-thread fillers therefor, or both. For example, plasticizing or softening agents may be added; also dyes, pigments, inorganic peroxides such as magnesium peroxide, barium peroxide, etc., or gas-evolving materials as, for instance, oxalic acid, oxamide, urea, ammonium carbonate, ammonium bicarbonate, ammonium alum or other organic or inorganic compounds capable of yielding an arc-interrupting gas under the arc heat.

What I claim as new and desire to secure by Letters Patent of the United States is:

1. An electric circuit interrupter comprising means for forming an arc, and an insulating structure disposed adjacent and in confining relation to said arc, the walls of said structure in proximity to said arc being surfaced with a composition comprising an artificial resin foundation material which upon decomposition by said arc yields an arc-interrupting gas and a filler therefor comprising threads of artificial resin adapted to yield an arc-interrupting gas under an arc heat and having a melting point higher than the hardening point of the said foundation material.

2. An electric circuit interrupter comprising means for forming an arc, and an insulating tubular structure within which said arc is drawn, said tubular structure being in confining relation to said arc and having walls in proximity to said arc formed of a composition comprising an aminoplast and a filler therefor comprising solid but flexible threads of artificial resin which upon decomposition by said arc yields an arc-interrupting gas and having a melting point higher than the hardening point of the aminoplast.

3. An electric circuit interrupter including an arc-confining structure, the walls of said structure in proximity to said arc being formed of a composition comprising an aminoplast filled with solid but flexible threads of a resinous composition composed mainly of alkyd resin.

4. An electric circuit interrupter comprising means for forming an arc, and an insulating structure disposed adjacent and in confining relation to said arc, the walls of said structure in proximity to said arc being formed of flexible alkyd resin fabric combined with urea-formaldehyde resin.

5. An electric circuit interrupter including an arc-confining structure, the walls of said structure in proximity to said arc being surfaced with flexible alkyd resin fibers bonded together with an aminoplast.

VITALY GROSSE.